(12) United States Patent    (10) Patent No.:   US 12,668,493 B2

Okada et al.    (45) Date of Patent:   Jun. 30, 2026

(54) POLYCRYSTALLINE SILICON ROD AND PROCESS OF MANUFACTURING POLYCRYSTALLINE SILICON ROD

(71) Applicant: Shin-Etsu Chemical Co., Ltd., Tokyo (JP)

(72) Inventors: Tetsuro Okada, Niigata (JP); Naruhiro Hoshino, Niigata (JP); Masahiko Ishida, Niigata (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 539 days.

(21) Appl. No.: 18/303,738

(22) Filed: Apr. 20, 2023

(65) Prior Publication Data

US 2023/0339764 A1   Oct. 26, 2023

(30) Foreign Application Priority Data

Apr. 20, 2022   (JP) ................................. 2022-069194

(51) Int. Cl.
   B32B 9/00    (2006.01)
   C01B 33/035    (2006.01)

(52) U.S. Cl.
   CPC ........ C01B 33/035 (2013.01); *C01P 2004/12* (2013.01)

(58) Field of Classification Search
   CPC ................................................... C01B 33/035

USPC ......................................................... 428/408
See application file for complete search history.

(56) References Cited

U.S. PATENT DOCUMENTS

| | | | |
|---|---|---|---|
| 5,593,465 A | 1/1997 | Seifert et al. | |
| 5,976,481 A | 11/1999 | Kubota et al. | |

FOREIGN PATENT DOCUMENTS

| | | | |
|---|---|---|---|
| JP | 2805457 B2 | 9/1998 | |
| JP | 2017048098 A | 9/2018 | |
| WO | 1997044277 A1 | 11/1997 | |
| WO | WO 9744277 A1 * | 11/1997 | |
| WO | 2017038347 A1 | 3/2017 | |

OTHER PUBLICATIONS

Notice of Allowance from corresponding Japanese Patent Application No. 2022-069194 dated Aug. 5, 2025.

* cited by examiner

*Primary Examiner* — Daniel H Miller

(74) *Attorney, Agent, or Firm* — Ladas & Parry, LLP

(57) ABSTRACT

The present invention is related to a polycrystalline silicon rod manufactured with a Siemens method. The polycrystalline silicon rod having a length of 1 m or more in a longitudinal direction. An absolute value of a difference between compressive stress and tensile stress in residual stress in the longitudinal direction on a circumferential surface of the polycrystalline silicon rod is 22 MPa or less.

6 Claims, 7 Drawing Sheets

POLYCRYSTALLINE SILICON ROD

510

POLYCRYSTALLINE
SILICON ROD

POLYCRYSTALLINE SILICON ROD AND PROCESS OF MANUFACTURING POLYCRYSTALLINE SILICON ROD

TECHNICAL FIELD

The present invention relates to a polycrystalline silicon rod manufactured with a Siemens method and a process of manufacturing such a polycrystalline silicon rod.

The present application claims the priority of Japanese Patent Application No. 2022-069194 filed on Apr. 20, 2022, the contents of which are entirely incorporated by reference.

BACKGROUND ART

Polycrystalline silicon is a raw material for monocrystalline silicon used to manufacture semiconductors or a raw material for silicon used to manufacture solar cells. The Siemens method is known as a method of manufacturing polycrystalline silicon. In this method, a silane-based raw material gas is typically brought into contact with a silicon core wire being heated. Then, polycrystalline silicon is deposited on a surface of this silicon core wire with a chemical vapor deposition (CVD) method.

In the Siemens method, two silicon core wires extending vertically and one silicon core wire extending horizontally are assembled into a torii gate shape (inverted U-shape). This inverted U-shaped silicon core wire is connected at both ends to respective core wire holders, which are then fixed to a pair of metal electrodes mounted on a base plate. Actually, a plurality of sets of inverted U-shaped silicon core wires are typically mounted inside a reaction furnace.

The surface of the inverted U-shaped silicon core wire is heated by feeding an electric current thereto until it becomes at 900 to 1200° C. Then, a raw material gas, such as a mixed gas containing both trichlorosilane and hydrogen is brought into contact with the surface of the silicon core wire. As a result, polycrystalline silicon is vapor-grown on the surface of the silicon core wire, so that an inverted U-shaped polycrystalline silicon rod with a desired diameter is formed.

Polycrystalline silicon rods, as described above, tend to be larger in diameter and longer in length. A reason is that their required diameters have gradually increased with improvements in its peripheral technologies. As the diameters and lengths of such polycrystalline silicon rods increase, larger amounts of electric power are required to manufacture them.

Polycrystalline silicon has a property in which the electrical resistivity decreases as the temperature increases. Thus, such polycrystalline silicon rods tend to have higher temperature at or near their center and lower temperature on or near their outer surface. As the diameters increase, the temperature difference therebetween also increases.

As the diameter of a polycrystalline silicon rod becomes larger, latent stress becomes greater in the polycrystalline silicon rod in the course of the reaction or during cooling, especially after completion of the vapor deposition. As a result, damages such as cracks or peelings, breakages, or some other disadvantages are more likely to occur. One proposed countermeasure to reduce the damage is a method disclosed in Japanese Patent No. 2805457, for example, in which a force acting on a polycrystalline silicon rod is attenuated by movable electrodes.

Nevertheless, since the polycrystalline silicon rod with less damage manufactured by such methods is cooled down to room temperature without its stress released, great residual stress tends to inevitably remain therein.

SUMMARY OF INVENTION

Problem to be Solved by Invention

When the resultant rod is processed in the next step, such as when its length is set to a predetermined one, cracks are likely to be generated therein because the stress is partly released during cutting of the rod to cause an imbalance of the residual stress. In addition, once a crack is generated in the rod, this crack propagates throughout the rod. Eventually, products that need to be shipped in a rod shape may be difficult to be used.

In addition to the above, a polycrystalline silicon rod whose entire body has been cracked by the propagation is dangerous for operators because its fragments may be scattered, especially in a longitudinal direction thereof when receiving an impact. Accordingly, the improvement is urgently needed.

Some novel methods of decreasing residual stress in polycrystalline silicon rods have been proposed.

For example, Japanese Patent Application Laid-Open No. 2017-48098 proposes a method in which a step of depositing polycrystalline silicon rod is separated to an innermost region, an R/2 region, and an outermost surface region of a silicon core wire. Further, the temperature of the surface of the polycrystalline silicon rod is gradually decreased toward the end of each reaction stage. This method involves a step of decreasing the temperature of the surface of the polycrystalline silicon rod at appropriate timings, thus disadvantageously causing a lowered reaction speed and production rate.

WO97/44277 proposes a method in which a post-heat treatment is performed after the completion of the reaction in order to reduce distortion. This method involves a heat treatment step in addition to a regular precipitation step, which also disadvantageously causes a lowered production rate.

As described above, when such conventional arts are applied to polycrystalline silicon rods with large diameters and long lengths, the production efficiency may be greatly lowered in order to reduce residual stress (strain). In consideration of the above, an object of the present invention is to provide a polycrystalline silicon rod in which residual stress can be attenuated without its production efficiency being greatly lowered and which has a low risk of being broken due to crack propagation during processing.

[Concept 1]

Means for Solving Problem

The present invention may be a polycrystalline silicon rod manufactured with a Siemens method, the polycrystalline silicon rod having a length of 1 m or more in a longitudinal direction, wherein an absolute value of a difference between compressive stress and tensile stress in residual stress in the longitudinal direction on a circumferential surface of the polycrystalline silicon rod may be 22 MPa or less.

[Concept 2]

The present invention may be a process of manufacturing a polycrystalline silicon rod in which polycrystalline silicon is deposited on a silicon core wire with a Siemens method, the process may comprise manufacturing the polycrystalline silicon rod according to concept 1 such that a temperature difference $\Delta T$ in a cross-section of the polycrystalline silicon rod is at 200° C. or less over an hour or more before a reaction in the silicon polycrystalline rod is completed.

[Concept 3]

In the process of manufacturing a polycrystalline silicon rod according to concept 2, over an hour or more before the reaction is completed, an electric current supplied to manufacture the polycrystalline silicon rod may be continuously or intermittently decreased, and an amount of a raw material gas may be continuously or intermittently decreased.

[Concept 4]

In the process of manufacturing a polycrystalline silicon rod according to concept 2 or 3, a high-frequency power supply device may provide a high-frequency wave to a surface of the polycrystalline silicon rod over an hour or more before the reaction is completed.

[Concept 5]

In the process of manufacturing a polycrystalline silicon rod according to any one of concepts 2 to 4, the polycrystalline silicon rod may be grown using a supply gas containing a dopant over an hour or more before the reaction is completed.

[Concept 6]

In the process of manufacturing a polycrystalline silicon rod according to any one of concepts 2 to 5, when the polycrystalline silicon is deposited, a dummy polycrystalline silicon rod may be grown outside a periphery of the polycrystalline silicon.

The present invention can reduce an occurrence of damage, such as cracks, during processing of polycrystalline silicon that has been grown.

DETAILED DESCRIPTION

Figure 1:
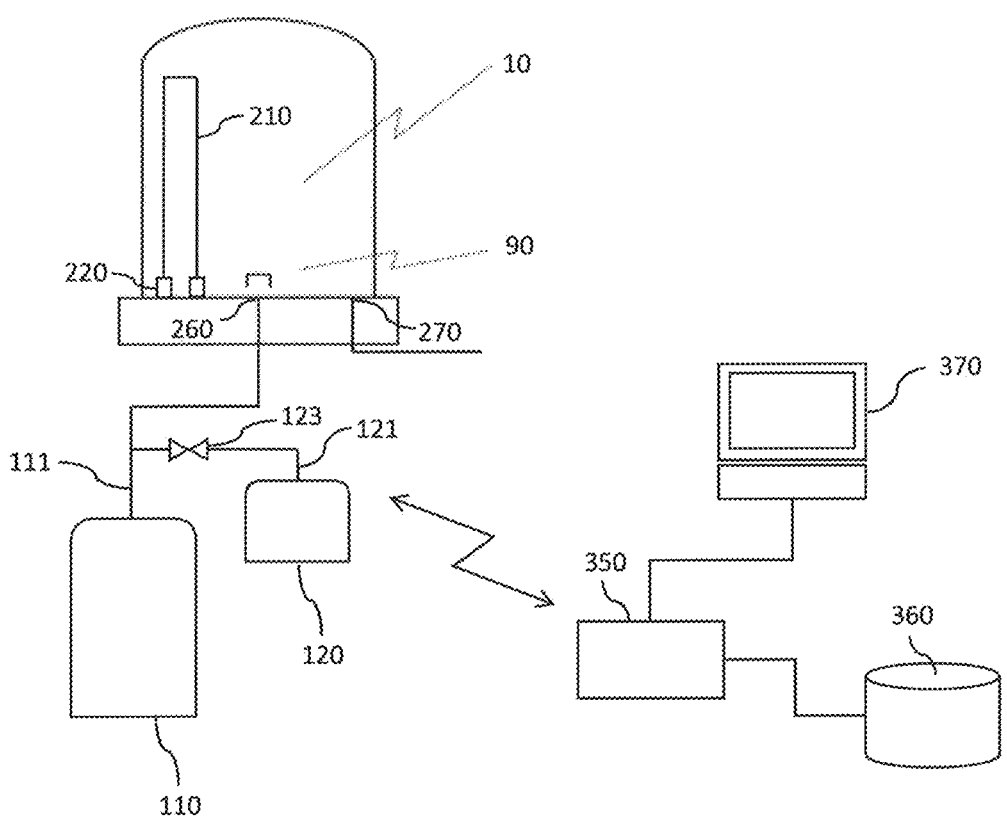
FIG. 1 is a schematic view of a reactor according to an embodiment of the present invention.

As illustrated in FIG. 1, a manufacturing apparatus (reactor) used to manufacture polycrystalline silicon rods includes: a reaction vessel 10; one or more pairs of electrodes 220 provided in the reaction vessel 10; a U-shaped electrode wire 210 attached to each pair of electrodes 220; supply parts 260 via which a supply gas containing a raw material gas is to be supplied into the reaction vessel 10; and discharge parts 270 via which an exhaust gas is to be discharged from the reaction vessel 10. In this reactor, polycrystalline silicon rods are generated with the Siemens method, by which polysilicon is grown through the CVD reaction, for example.

The manufacturing apparatus for polycrystalline silicon rods may further include: an input unit 370 that includes a personal computer, a smartphone, a tablet terminal, and other data processing device by which an operator performs an input operation; a control unit 350 that controls polycrystalline silicon rods in the manufacturing apparatus in various ways; and a storage unit 360 that stores various information. The storage unit 360 may store a series of procedures, called a recipe, whereas the control unit 350 may read the recipe from the storage unit 360. As a result, the manufacturing apparatus may manufacture polycrystalline silicon rods in accordance with predetermined procedures.

A surface temperature of polycrystalline silicon rod, which corresponds to a reaction temperature thereof, is conventionally believed to affect final residual stress. The inventors, however, confirm that it is possible to sufficiently attenuate residual stress by decreasing a difference in temperature across a cross-section of the silicon polycrystalline rod (or a cross-section orthogonal to a longitudinal direction in which the silicon polycrystalline rod extends) at least one hour before precipitation is stopped. In this embodiment, an absolute value of a difference between compressive stress and tensile stress in the residual stress in a longitudinal direction on a circumferential surface of the rod is 22 MPa or less; it is preferably 20 MPa or less; more preferably 16 MPa or less; and still more preferably 10 MPa or less.

To decrease a temperature difference $\Delta T$ on any cross-section of a silicon polycrystalline rod to 200° C. or less, any conceivable method may be used, some examples of which are as follows. Of a polycrystalline silicon rod that has been grown into a U shape, each straight part feeds a larger amount of electric current toward the rod center so that it has a high temperature, and a curved part between each straight part and a bridge part feeds a larger amount of electric current toward an incurved rod surface. As a result, the amount of heat generated per unit volume becomes higher in each curved part than in the center of each straight part. Because of heat removal by heat radiation or convection, however, the incurved rod surface of each curved part and the center of each straight part have similar temperatures. As an example, these temperatures can be analyzed by a finite element method (FEM) numerical analysis in which a thermal fluid is coupled to an electromagnetic field. Although varying depending on conditions related to various reactions, the temperature difference is typically proportional to a diameter of the polycrystalline silicon rod. In consideration of this fact, an internal temperature of each straight part is estimated by measuring a temperature of the incurved surface of each curved part with a radiation thermometer. Then, a temperature difference $\Delta T$ of each straight part of the polycrystalline silicon rod is determined. With this aspect, a temperature difference $\Delta T$ across the cross-section of the silicon polycrystalline rod is determined. Alternatively, $\Delta T$ may be determined simply by calculating the rod temperature through the FEM analysis under various reaction conditions being set. A lower limit value of a time until the temperature difference $\Delta T$ becomes 200° C. or less is preferably an hour. From the viewpoint of decreasing the difference between the compressive stress and the tensile stress, the lower limit value of the time until which the temperature difference $\Delta T$ becomes 200° C. or less is more preferably 1.5 hours, and still more preferably 2 hours. On the other hand, from the viewpoint of not suppressing the production efficiency from being excessively lowered, the upper limit value of the time until which the temperature difference ΔT becomes 200° C. or less is preferably five hours, more preferably 3.5 hours, and still more preferably two hours.

(Approach 1)

It is conceivable, by decreasing an electric current flowing through polycrystalline silicon before the completion of the reaction, the internal temperature thereof is decreased, and moreover the flow rate of the reaction gas is lowered. In this way, the surface temperature is suppressed from being lowered, and the temperature difference is thereby decreased (see Example 1 described later). In this case, the electric current may be continuously or intermittently decreased to 70% of the maximum electric current over three to five hours in order to decrease the internal temperature of the polycrystalline silicon. The amount (kg/h) of raw material gas may be continuously decreased to 30% of the maximum amount over three to five hours in order to suppress a decrease in the surface temperature. This control may be performed by the control unit 350 reading the recipe stored in the storage unit 360 or in accordance with an instruction from the operator via the input unit 370.

(Approach 2)

Figure 2:
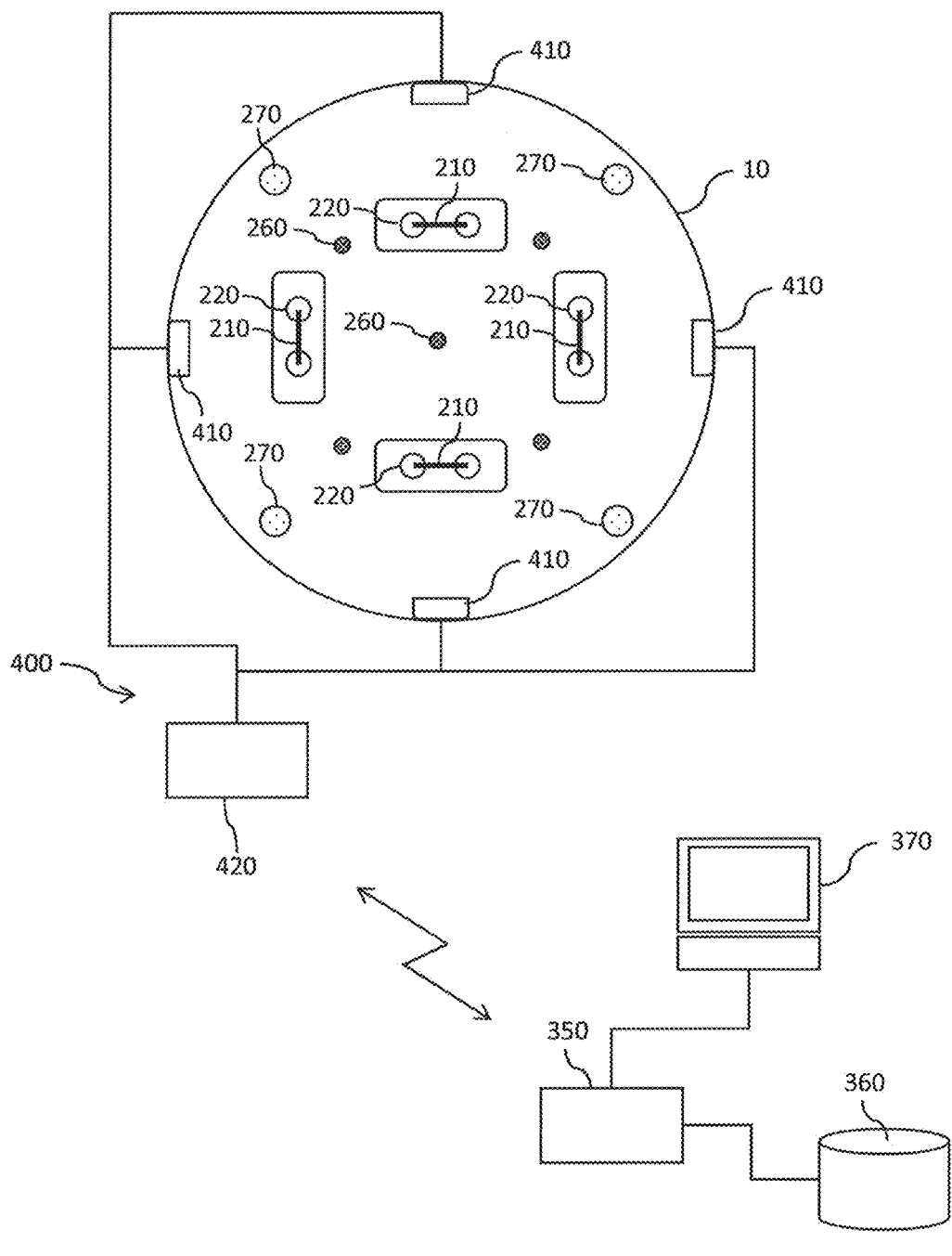
FIG. 2 is a top plan view of an inside of a reaction vessel, which illustrates an aspect using a high-frequency power supply device in the embodiment of the present invention.

It is conceivable that, to make the surface temperature of the polycrystalline silicon rod uniform, a high-frequency power supply device 400 is used to concentrate Joule heat on the surface of the rod, thereby decreasing the temperature difference over an hour or more before the end of the reaction (see FIG. 2). As illustrated in FIG. 2, a plurality of antennas 410 of the high-frequency power supply device 400 may be provided on an inner surface of the reaction vessel 10. In addition, the antennas 410 may receive an output from the high-frequency power supply device 400 and provide a high-frequency wave into the reaction vessel 10.

To increase the surface temperature to a temperature at which the deposition reaction can occur, electric power is transmitted to the electrodes 220, thereby increasing the surface temperature of the polycrystalline silicon rod. However, since the surface to be deposited increases with an increase in the diameter, a large amount of electric power is transmitted to the electrode 220. Since an electric resistivity of Si decreases with the temperature rise, the increases in both the temperature at the center of the rod and the electric current become effective synergistically. As a result, the temperature of the inside of the deposited polycrystalline silicon and electrode wires 210, such as silicon core wire, increases, thereby increasing a difference between this temperature and a temperature of the surface of the polycrystalline silicon rod. Conceivable means for increasing only the surface temperature in order to eliminate the temperature difference is to use the high-frequency power supply device 400, as illustrated in FIG. 2, to generate a high-frequency wave on the surface of the silicon rod, thereby decreasing the difference in temperature between the inside and surface of the silicon rod. The high-frequency power supply device 400 may be operated by the control unit 350 reading the recipe stored in the storage unit 360 or in accordance with an instruction from the operator via the input unit 370.

(Approach 3)

In the second half of the reaction (one hour or more before the completion of the reaction), a dopant, such as B, P, As, or Al, may be added to the raw material gas containing both trichlorosilane and hydrogen. Then, the Joule heat is concentrated on an outer circumference of a polycrystalline silicon rod since the electric resistivity thereof decreases. In this way, the temperature difference is decreased. When this aspect is employed, it is possible to reduce the amount of heat removed when the polycrystalline silicon is formed, thereby relatively decreasing the difference in temperature between the inside and outer surface of the polycrystalline silicon rod. In short, a deliberate increase in the amount of dopant can decrease the electrical resistivity on the outer circumference of the rod in comparison with that at the center, thereby increasing the electric current flowing through the outer circumference. It should be noted that attention is required to control the temperature of the raw material gas. When the raw material gas has an excessively high temperature, polycrystalline silicon is correctly generated on the surface, but it may also be generated in the reaction vessel 10 and left therein as particles. The raw material gas containing both trichlorosilane and hydrogen may be supplied from a raw material gas supply unit 110, whereas the dopant may be supplied from a dopant supply unit 120. A dopant supply pipe 121 of the dopant supply unit 120 through which the dopant is supplied may be joined, via a valve 123, to a raw material gas supply pipe 111 through which the raw material gas is supplied. The valve 123 may be opened and closed under the control of the control unit 350 (see FIG. 1). When the valve 123 is opened, the dopant is mixed into the raw material gas. When the valve 123 is closed, the mixing of the dopant into the source gas is stopped.

(Approach 4)

Figure 3:
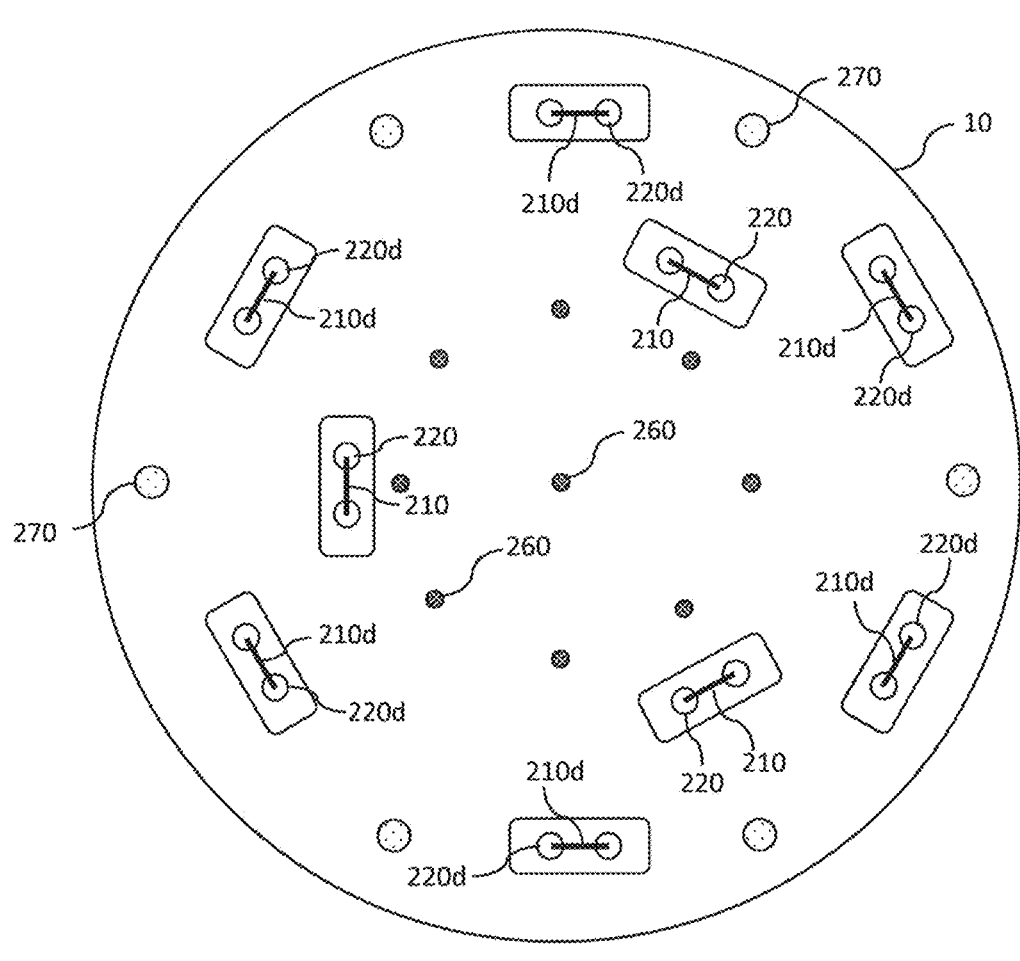
FIG. 3 is a top plan view of the inside of the reaction vessel, which illustrates an aspect in which dummy polycrystalline silicon rods are grown outside the peripheries of polycrystalline silicon rods in the embodiment of the present invention.

Some polycrystalline silicon rods (dummy polycrystalline silicon rods) may be disposed assuming that they are crushed so as to surround the outer circumferences of polycrystalline silicon rods (see FIG. 3). It is also conceivable that electrical power supplied to electrodes 220d to increase the temperature of electrode wires 210d. In response, silicon is deposited and grown around the electrode wires 210d to form dummy polycrystalline silicon rods. These dummy polycrystalline silicon rods radiate heat, which decreases the difference in temperature between the surface and inside of polycrystalline silicon rods to be manufactured (i.e., the polycrystalline silicon rods different from the dummy polycrystalline silicon rods) (see Example 2 to be described later). A plurality of dummy polycrystalline silicon rods may be provided, in which case the number of dummy polycrystalline silicon rods may be 1.5 to three times that of polycrystalline silicon rods to be manufactured. As an example, four to eight (two to four pairs) target polycrystalline silicon rods may be grown, whereas six to 24 (three to 12 pairs) dummy polycrystalline silicon rods may be grown outside the peripheries of these target polycrystalline silicon rods. In FIG. 3, the electrodes used to generate the dummy polycrystalline silicon rods are each denoted by 220d, and the U-shaped electrode wires used to generate the dummy polycrystalline silicon rods are each denoted by 210d.

(Approach 5)

Aside from the above, decreasing inner pressure of the furnace can decrease the amount of heat removed from the surface of the polycrystalline silicon rods by the supply gas, thereby decreasing the temperature difference ΔT.

Two or more of the aspects in approaches 1 to 5 described above may be combined together as appropriate in order to decrease the temperature difference ΔT.

To measure the internal temperature of a polycrystalline silicon rod, a sample may be prepared. Thermometers may be installed on the sample of a polycrystalline silicon rod at appropriate locations in a radial direction thereof in the course of the growth. Then, how the internal temperature of the polycrystalline silicon rod varies may be measured. In this case, it may be assumed that the internal temperatures of polycrystalline silicon rods being grown under the same condition exhibit the same behavior. In this case, a plurality of polycrystalline silicon rods may be prepared as samples. Internal temperatures of these polycrystalline silicon rods may be measured based on the average thereof. The number of factors in removing heat from the surface of a polycrystalline silicon rod may be minimized. Then, the electric current may be controlled in accordance with the temperature of the surface of the rod. Examples of these heat removal factors include convection caused by the supply gas, such as a raw material gas. In this case, for example, the number of heat removal factors can be decreased by reducing the amount of the supply gas supplied.

EXAMPLES

Comparative Example

A polycrystalline silicon rod was grown with its surface temperature set to about 1050 to 950° C. until its diameter became 125 mm (the diameter of each straight part became 125 mm). Then, the supply of both the electric current and the supply gas was stopped. After the polycrystalline silicon rod had been sufficiently cooled down, the inside of the reactor was replaced with nitrogen. Then, the reactor opened, and the polycrystalline silicon rod was removed therefrom.

Example 1

A polycrystalline silicon rod was grown in accordance with a regular manufacturing process with its surface temperature set to about 1050 to 950° C. until its diameter became 121 mm. After that, to decrease the internal temperature that had been higher than the surface temperature, the electric current was reduced so that the temperature of the incurved surface of each curved part of the U-shaped rod decreased; the incurved surface of each curved part was assumed to have an internal temperature of −30° C. More specifically, the electric current was continuously decreased from 2012A to 1490A over two hours. In addition, to maintain the surface temperature at 1050 to 950° C. during the reaction, the amount of supply gas was gradually and continuously decreased over two hours until it became equal to 60% of the maximum amount of supply gas. In this way, the difference between the internal and the external temperatures was maintained at 200° C. or less over two hours or more. After the polycrystalline silicon rod had been grown until its diameter became 125 mm, the supply of both the electric current and the supply gas was stopped. After the polycrystalline silicon rod was sufficiently cooled down, the inside of the reactor was replaced with nitrogen. Then, the reactor was opened, and the polycrystalline silicon rod was removed therefrom.

Example 2

Twelve polycrystalline silicon rods were placed vertically around other six polycrystalline silicon rods and then grown with their surface temperature set to 1050 to 950° C. until their diameters became 121 mm. After that, the electric current was decreased with the rod surface temperature maintained at 1050 to 950° C. while the amount of supply gas being gradually decreased, which was similar to the process in Example 1. More specifically, the electric current was continuously decreased under the same conditions as in Example 1, with the amount of supply gas being continuously decreased from 302 to 181 kg/h over two hours. In this way, the difference between the internal and the external temperatures was maintained at 200° C. or less over two hours or more. In this case, heat radiated from the twelve polycrystalline silicon rods, which were arranged around the six polycrystalline silicon rods, was used to eliminate the need to decrease the amount of supply gas as much as in Example 1. This leads to the improvement in the production efficiency. Then, the supply of the electric current to the six polycrystalline silicon rods was stopped. After an hour, the supply of the electric current to the twelve surrounding polycrystalline silicon rods was also stopped. After the rod had been sufficiently cooled, the inside of the reactor was replaced with nitrogen. Then, the reactor was opened, and the rods were removed therefrom. The six rods manufactured in this manner were used as rods in Example 2.

Figure 4:
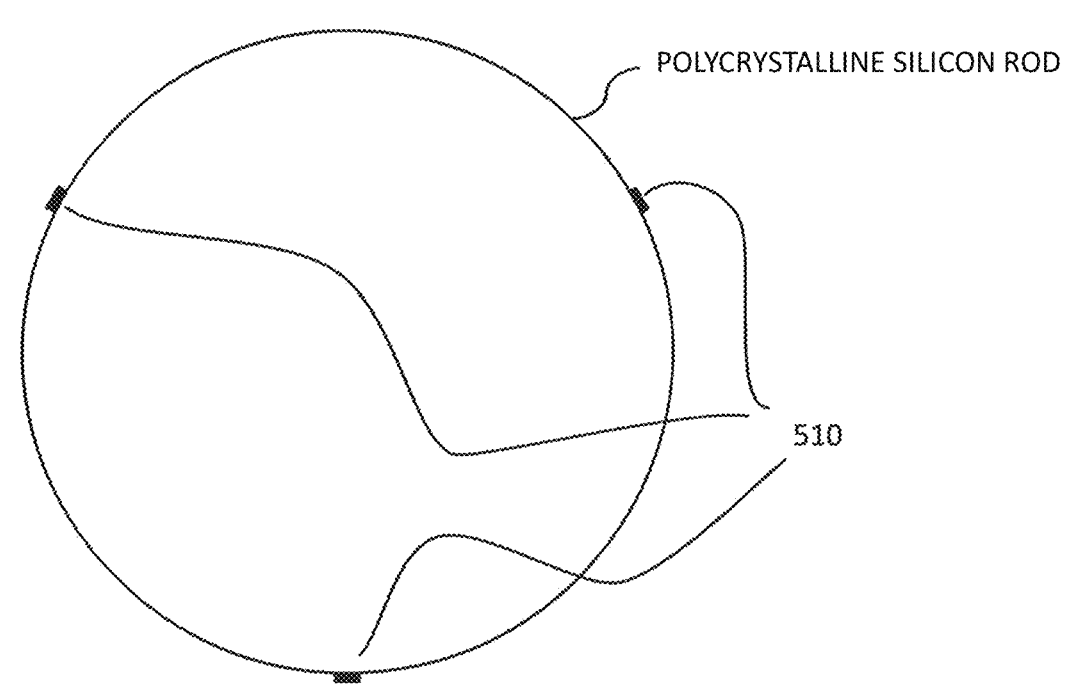
FIG. 4 is a top plan of an aspect in which strain gauges are attached onto a polycrystalline silicon rod.
Figure 5:
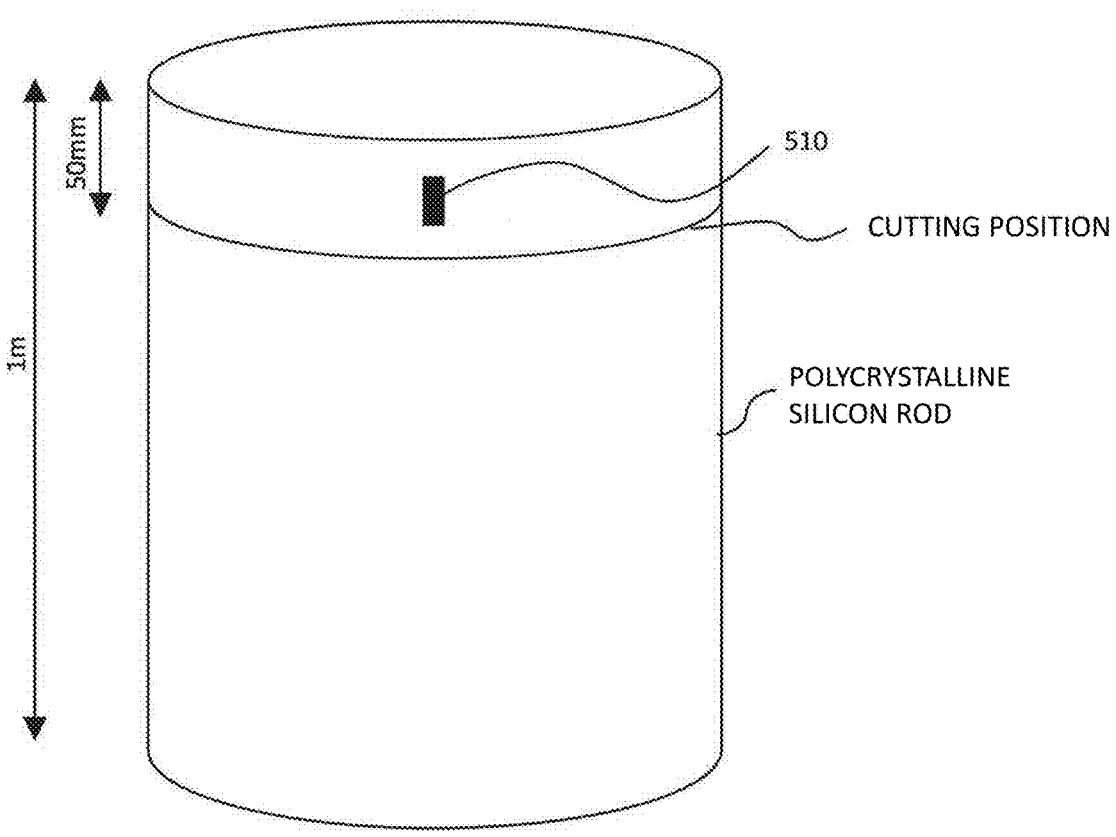
FIG. 5 is a perspective view of the aspect in which strain gauges are attached onto the polycrystalline silicon rod.
Figure 6:
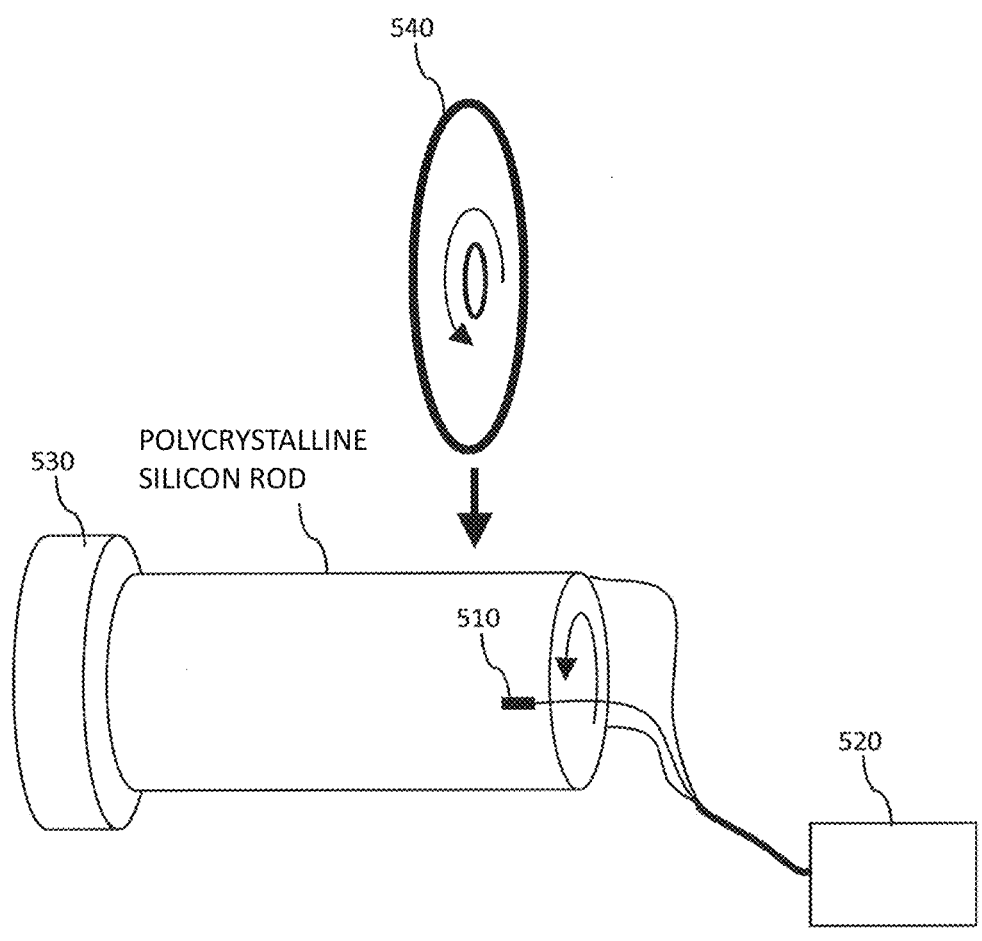
FIG. 6 is a perspective view of an aspect in which the polycrystalline silicon rod with the strain gauges are being cut.

The polycrystalline silicon rods in Comparative example and Example 1 and one of the six polycrystalline silicon rods in Example 2 were each cut into two pieces at their center. Then, each of them was arranged into a cylindrical shape having a length of 1 m, after which three strain gauges 510 were attached onto the circumferential surface of each rod at equal intervals (120 degrees angle) in a circumferential direction thereof (see FIG. 4). Then, each rod was cut at a point 50 mm apart from the top and under the strain gauges 510 at a constant speed while being rotated so that the depth of the incision from the entire circumferential surface (360°) of each rod became uniform in a radial direction (see FIG. 5). In this case, each polycrystalline silicon rod was held by a chuck 530 and then cut by a peripheral cutting edge 540. In the course of the cutting, a difference between the compressive stress and the tensile stress in the residual stress on the circumferential surface of each rod in a longitudinal direction thereof was recorded by a data logger 520 (see FIG. 6).

Figure 7:
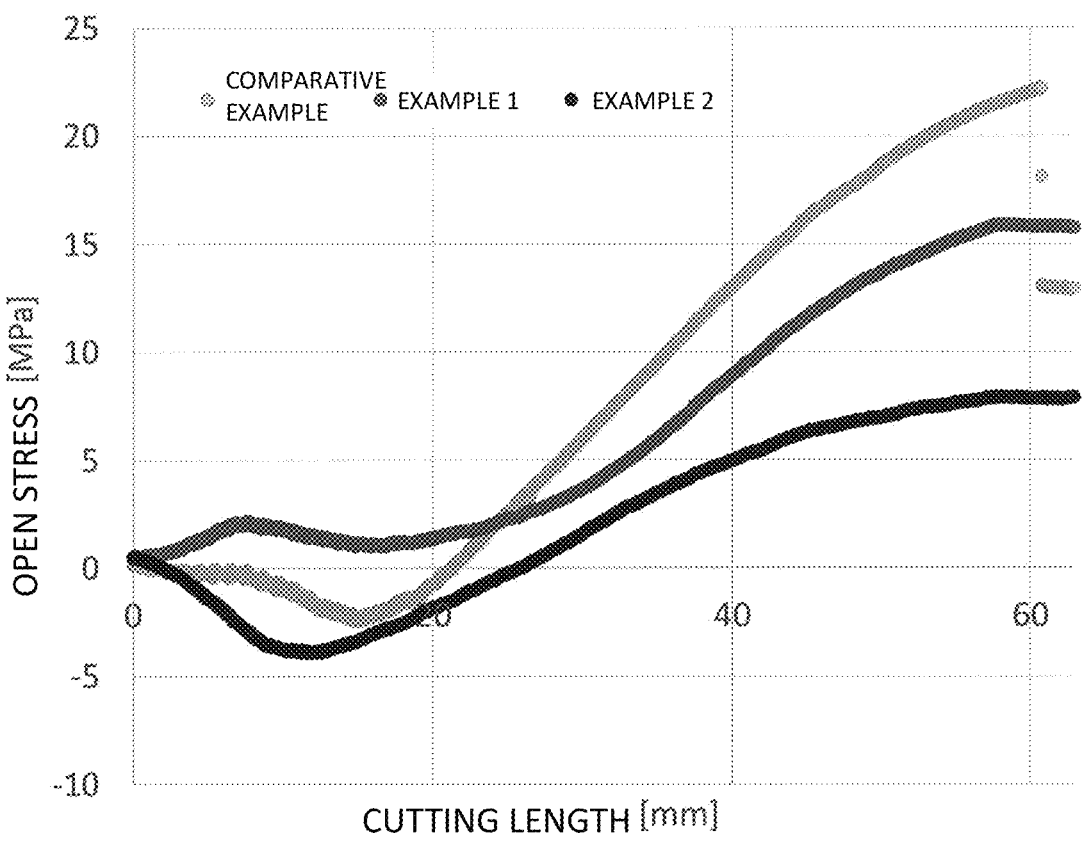
FIG. 7 is a graph showing residual stresses in both a conventional polycrystalline silicon rod and a polycrystalline silicon rod according to the embodiment of the present invention; the residual stresses are measured with a strain release method.

FIG. 7 illustrates an average of values obtained under the condition that the Young's modulus of polycrystalline silicon is deemed to be 165 GPa and the strain is deemed to be the residual stress. The open stress on the vertical axis represents the difference between the compressive stress and the tensile stress in the residual stress on the circumferential surface of the rod in the longitudinal direction thereof.

In the polycrystalline silicon rod manufactured in the comparative example, blocks with the strain gauges 510 were broken when the cutting depth exceeded 60 mm in the radial direction. The stress was about 23 MPa immediately before broken. It is apparent from this that the open stress on the rod exceeded 23 MPa.

It is confirmed that the open stress on the rod manufactured in Example 1 is decreased to 16 MPa, whereas the open stress on the rod manufactured in Example 2 is decreased to half or less of about 23 MPa, which is observed from the rod in Comparative example.

The description of each embodiment and the disclosure of the figures described above are merely examples for describing the invention described in the claims, and the invention described in the claims is not limited by the description of the embodiments or the disclosure of the figures described above. In addition, the description of the claims as originally filed is merely an example, and the description of the claims can be appropriately changed based on the description of the specification, the figures, and the like.

REFERENCE SIGNS LIST

10 Reaction vessel
110 Raw material gas supply unit

120 Dopant supply unit
1210 Electrode wire
220 Electrode
350 Control unit
400 High-frequency power supply device

The invention claimed is:

1. A process of manufacturing a polycrystalline silicon rod in which polycrystalline silicon is deposited on a silicon core wire with a Siemens method, the process comprising manufacturing the polycrystalline silicon rod such that a temperature difference AT in a cross-section of the polycrystalline silicon rod is at 200° C. or less over an hour or more before a deposition of polycrystalline silicon is completed, wherein an absolute value of a difference between compressive stress and tensile stress in residual stress in the longitudinal direction on a circumferential surface of the polycrystalline silicon rod is 22 MPa or less.

2. The process of manufacturing a polycrystalline silicon rod according to claim 1, wherein over an hour or more before the reaction is completed, an electric current supplied to manufacture the polycrystalline silicon rod is continuously or intermittently decreased, and an amount of a raw material gas is continuously or intermittently decreased.

3. The process of manufacturing a polycrystalline silicon rod according to claim 1, wherein a high-frequency power supply device provides a high-frequency wave to a surface of the polycrystalline silicon rod over an hour or more before the reaction is completed.

4. The process of manufacturing a polycrystalline silicon rod according to claim 1, wherein the polycrystalline silicon rod is grown using a supply gas containing a dopant over an hour or more before the reaction is completed.

5. The process of manufacturing a polycrystalline silicon rod according to claim 1, wherein when the polycrystalline silicon is deposited, a dummy polycrystalline silicon rod is grown outside a periphery of the polycrystalline silicon.

6. The process of manufacturing a polycrystalline silicon rod according to claim 1, wherein over an hour or more before the reaction is completed, (1) an electric current supplied to manufacture the polycrystalline silicon rod is continuously or intermittently decreased and an amount of a raw material gas is continuously or intermittently decreased, (2) a high-frequency power supply device provides a high-frequency wave to a surface of the polycrystalline silicon rod, and (3) the polycrystalline silicon rod is grown using a supply gas containing a dopant, and wherein when the polycrystalline silicon is deposited, a dummy polycrystalline silicon rod is grown outside a periphery of the polycrystalline silicon.

* * * * *